Feb. 23, 1943. R. C. HERGENROTHER Re. 22,275

CATHODE-RAY TUBE

Original Filed July 25, 1940

INVENTOR
RUDOLF C. HERGENROTHER
BY Laurence B. Dodds
ATTORNEY

Reissued Feb. 23, 1943

Re. 22,275

UNITED STATES PATENT OFFICE 22,275

CATHODE-RAY TUBE

Rudolf C. Hergenrother, Beechhurst, N. Y., assignor to Hazeltine Corporation, a corporation of Delaware Original No. 2,295,038, dated September 8, 1942, Serial No. 347,389, July 25, 1940. Application for reissue December 21, 1942, Serial No. 469,730

18 Claims. (Cl. 250—162)

Figure 1:
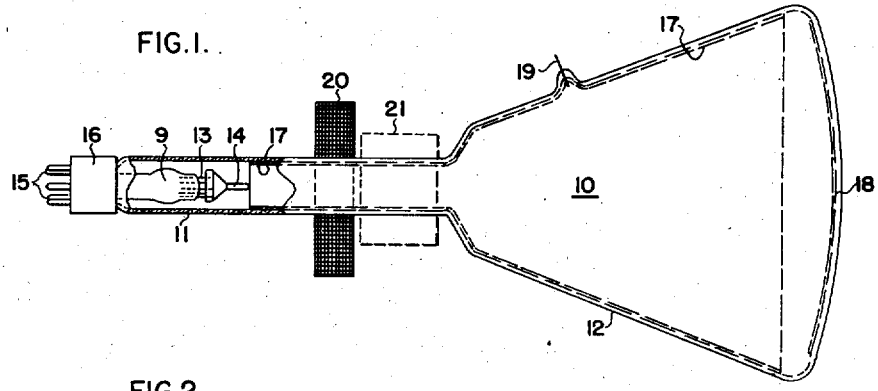

The present invention relates to cathode-ray tubes and, particularly, to an improved cathode-ray tube especially suitable for use as the image reproducer in television systems.

Conventional cathode-ray tubes include a multi-electrode electron gun, the function of which is to produce a beam of electrons of elementary cross-section. The electron gun of cathode-ray tubes employed in television systems generally has as an element thereof a grid which is used to modulate the electron beam in accordance with video signals applied thereto. The first anode, grid, and cathode elements, when suitably energized, form a first electron lens of the tube which serves to gather electrons emitted by the cathode and concentrate the electrons within a beam of small cross-sectional area adjacent the grid aperture. There is thus formed a constriction in the cathode-ray beam known as the "electron cross-over" which serves as the "electron object" to be focused on the fluorescent screen of the tube by a second electron lens of either the electrostatic or magnetic type. The size of the electron-cross-over, and hence the size of the focused electron spot on the fluorescent screen, depends on the focal properties, that is, on the electric field distribution in the first electron lens.

It has been shown that, in the absence of space-charge effects, the size of the electron cross-over for a given electron gun at given anode potentials depends only on the energy distribution of the thermionic electrons leaving the cathode. In practice, however, the size of the electron spot on the fluorescent screen increases quite rapidly with increasing cathode-ray current, due, at least partly, to the effect of increasing space charge at the cross-over which effectively increases the cross-over size. It is, therefore, desirable to decrease the space charge to a minimum, thus increasing the maximum permissible value of the cathode-ray current which is limited to a value corresponding to the maximum spot size which will still permit full resolution of image detail. Any decrease in cross-over size is very desirable since it will allow an increase in the picture brightness without loss of detail, or will allow a decrease in the required value of the anode voltage at the same picture brightness without loss of detail.

In addition to the effect of space charge on the cross-over size, increasing values of beam current cause the angle of divergence of the electron beam leaving the electron cross-over to increase. The angle of divergence must be kept within certain limits because the spherical aberration of the second electron lens increases as the square of the effective lens aperture for any given lens. This aberration must be kept below the value at which it seriously affects the spot size. Aside from spot size, the shape of the spot on the fluorescent screen tends to be distorted by the deflecting fields of the scanning system. This distortion increases as the diameter of the cathode-ray beam in the scanning zone and thereby increases directly with the angle of divergence. The spot size at the center of the fluorescent screen is thus determined by the combined effects of cross-over size and spherical aberration of the second electron lens, whereas the spot size at the edges of the fluorescent screen is additionally affected by the distortion produced by the deflecting fields of the scanning system. The scanning distortion may be quite serious in cathode-ray tubes adapted to have the cathode-ray beam deflected over a wide angle and may determine the upper limit on the permissible beam current in these tubes.

As an aid in reducing both the space charge, and consequently the size of the cross-over, and the angle of divergence of the electron beam for any given luminous intensity of the spot, it has been found desirable to produce the maximum electrostatic field intensity close to the grid aperture of the first electron lens. This has been accomplished in certain tubes of the prior art by forming the first anode as an apertured frustum-shaped member of small diameter and by positioning the apex of the anode in close proximity to, and coaxially aligned with, the grid aperture. In this arrangement, the spacing of the anode from the grid and the size of the anode aperture are the only critical factors in reducing the magnitude of the space charge and the angle of divergence of the electron beam. Such tube construction has the disadvantage first, that the alignment of the anode and grid is extremely critical for satisfactory operation of the tube and, secondly, the first anode receives electrons directly from the cathode, thereby not only wasting power but causing the anode to heat up to a high temperature and also "fogging" the cathode-ray beam by secondary electron emission from the anode.

Other cathode-ray tubes of the prior art have attempted to reduce the space charge and decrease the angle of divergence of the electron beam by the use of an apertured, disc-shaped, first anode closely spaced to, and coaxially aligned with, the grid. Arrangements of this nature also have the disadvantage that the alignment of the anode and grid is extremely critical for satisfactory focusing of the electron beam. Another difficulty encountered in both the prior art electron gun structures described above is that because of the critical nature of the alignment, the anode must be supported on a common member, usually the reentrant glass stem of the tube, with the grid and cathode. The stray electric fields around the anode supporting wires and the electrical connection to the outside of the bulb may produce cold electron emission or electrical breakdown of the insulation when high anode voltages are used.

It has also been proposed that the size and distortion of the luminescent spot on the fluorescent screen be reduced for a given image detail and brightness by positioning a cylindrical first anode of diameter only slightly larger than that of the grid in coaxial relation to the grid with the proximate ends of the anode and grid lying substantially in the same plane. Tubes of this nature have the disadvantage that they require an excessively high second anode potential and require a relatively complicated and expensive construction by which the first anode is supported from the neck of the cathode-ray tube.

It is an object of the invention, therefore, to provide a cathode-ray tube of simplified and improved construction which, while of general application, is especially suitable for use as the image reproducer in television systems and one which avoids one or more of the above-mentioned disadvantages of the prior art cathode-ray tubes.

It is a further object of the invention to provide a cathode-ray tube which requires for its proper operation a value of second anode potential appreciably smaller than that required by similar tubes of the prior art, yet one in which the reduction of anode voltage does not involve any sacrifice of picture brightness nor loss of picture detail.

It is an additional object of the invention to provide a cathode-ray tube capable of forming a cathode-ray beam having a minimum size of cross-over and minimum angle of divergence, whereby, for a given picture detail and given value of anode voltage, a brighter picture is produced and there is little or no distortion of the luminescent spot as the beam is deflected during the scanning operation.

In accordance with the invention, a cathode-ray tube comprises a source of electrons, a first electron lens comprising an annular first anode and an annular apertured control electrode surrounding said source of electrons, and means for supporting the control electrode and the anode substantially in coaxial alignment. The control electrode has an external dimension transverse its axis less than 0.15 times that of a corresponding internal dimension of the anode measured transverse the axis thereof.

In a specific form of the invention, a cathode-ray tube comprises an evacuated tube envelope having a substantially cylindrical neck of uniform cross-section along its length, and a first electron lens comprising a substantially cylindrical grid and an electrically conductive first anode coating on the walls of the neck of the tube envelope. The grid and cathode are preferably as small as manufacturing facilities permit, the cathode having an emissive surface, the permissible electron emission of which is at least as high as 50 milliamperes per square centimeter of emissive surface.

For a better understanding of the present invention, together with other and further objects thereof, reference is had to the following description taken in connection with the accompanying drawing and its scope will be pointed out in the appended claims.

Figure 2:
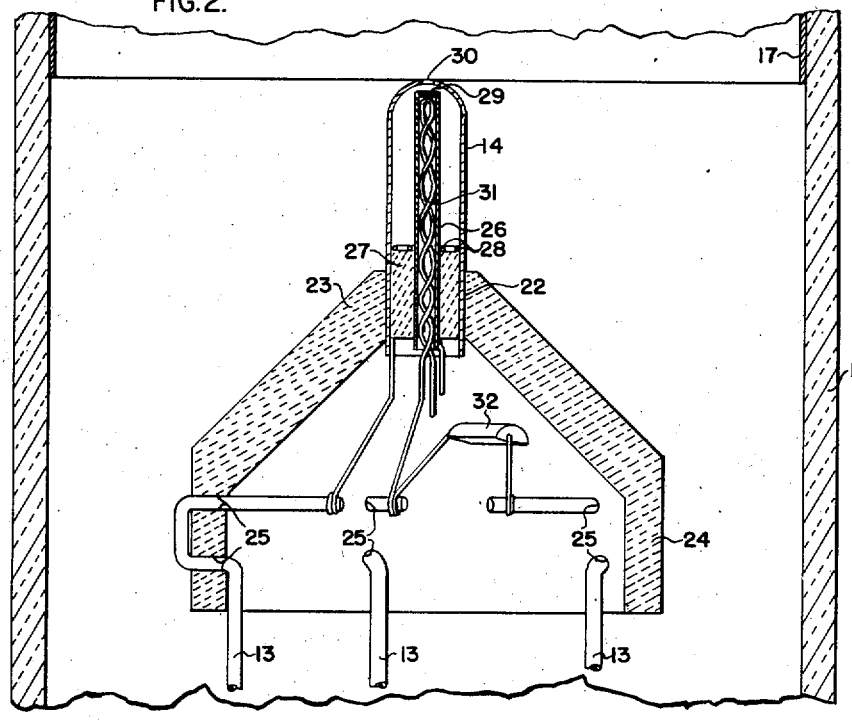
Figure 3:
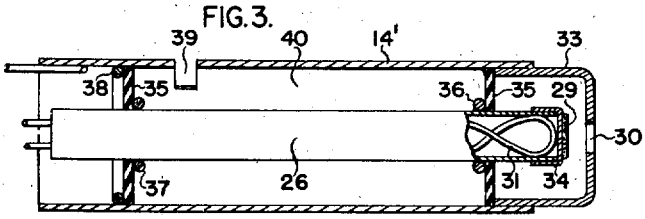

Referring now to the drawing, Fig. 1 is a side elevation, partly in section, of a complete cathode-ray tube embodying the invention in a preferred form; Fig. 2 is an enlarged cross-sectional view of the electron gun of the Fig. 1 arrangement; and Fig. 3 represents a modified form of grid and cathode assembly suitable for use in the cathode-ray tube of the invention.

It has previously been pointed out that the spot size characteristic can be improved by reduction both of the space charge, and consequent reduction of the cross-over area, and angle of divergence of the electron beam. This may be accomplished by the expedient of increasing in the vicinity of the grid aperture the electrostatic field intensity of the first electron lens. The present invention makes use of the phenomenon that the electrostatic field intensity at the end of the smaller of two cylindrical, axially displaced, and coaxially arranged conductors of different diameters is rapidly increased as the diameter of the smaller of the two conductors is reduced to an infinitely small value. In accordance with the invention, the larger cylindrical conductor is made the anode of the tube while the smaller conductor is made the grid. The latter, however, necessarily encloses the cathode, the emissive surface of which must be perpendicular to the axis of both the anode and the grid. Thus, the required electron emission for a given beam current constitutes a definite limitation on the minimum physical size of the cathode and thereby on the minimum diameter of the grid.

An oxide-coated cathode operates at electron saturation of the order of 700 milliamperes per square centimeter of emissive surface. Although operation at current saturation causes a rapid deterioration in electron emission, thereby shortening the life of the cathode-ray tube, the shortening in life is disproportionately smaller with values of cathode current only slightly below saturation and it is thus possible to have a cathode of sufficiently long life as to be commercially practicable when the cathode is operated at an electron-emission density greater than 50 milliamperes per square centimeter of cathode-emissive area and, in fact, of the order of several hundred milliamperes per square centimeter of emissive area. It is obvious that the smaller the cathode-emissive area, the smaller the diameter or the effective external dimension transverse the axis of the surrounding grid may be, whereby the grid and its enclosed cathode approach an electrical conductor of relatively small dimensions with consequent high increase in the electrostatic field intensity in the vicinity of the grid aperture. The lower limit of the cathode-emissive area in square centimeters is equal to the maximum required beam current in milliamperes divided by the maximum allowable emission current density which, as has already been stated, may vary from 50 to several hundred milliamperes per square centimeter depending on the specific nature of the oxide emitter. The limit in this regard is, in general, reached when the cathode and grid become so small as to be limited only by practical manufacturing capabilities.

Referring now to Fig. 1 of the drawing, there is illustrated a complete cathode-ray tube embodying the invention. The tube comprises an evacuated tube envelope 10 having a substantially cylindrical neck portion 11 preferably of uniform cross-section along its length and a flared bulb portion 12. One end of the neck 11 is formed into a re-entrant stem 9 through which are sealed, and from which are supported, a plurality of relatively rigid electrical conductors 13. These conductors support a substantially cylindrical or annular apertured control electrode or grid 14 substantially in coaxial relation or alignment with respect to the tube neck 11 and also complete electrical circuits from the grid 14, and from the thermionic cathode or source of electrons and its heater, which are not shown but which are enclosed within the grid, to prongs 15 provided on a tube base 16 fixedly secured to the closed end of the tube neck.

The inside walls of the neck 11 and the flared bulb 12 have an electrically-conductive coating 17 formed thereon to provide a substantially cylindrical or annular first anode. This coating, which may be formed by deposit from a commercial product merchandised under the trade name "Aquadag," a commercial form of an aqueous colloidal suspension of graphite, is a continuous electrically-conductive anode coating which extends from a fluorescent screen 18, formed on the flared end of the tube envelope, along the inner walls of the flared bulb and neck portions of the envelope to a plane which is perpendicular to the axis of the neck 11 and which preferably includes the apertured end of the grid 14. The distance between the plane defining the end of the anode cylinder and the grid aperture is not critical. The apertured end of the grid may be placed far within the anode cylinder or may be withdrawn sufficiently that the distance from the grid aperture to the plane defining the end of the anode is of the order of one-half the anode radius, either extreme position of the grid having no significant change in the first electron lens action as long as the axial alignment of the grid and anode is maintained. The effect of any irregularities in the trim of the anode cylinder on the electric field at the grid aperture would increase as the grid is withdrawn from the anode and decrease as the grid is placed deeper within the anode. Electrical connection is made to the coating 17 through a lead-in conductor 19 sealed through the side of the tube envelope 12. The grid 14 and anode 17, when suitably energized, provide a first electron lens, the function of which is to produce a cathode-ray beam of elemental cross-section at its electron cross-over and directed toward the fluorescent screen 18 of the tube.

A second electron lens of the magnetic type is provided by a focusing coil 20, comprising a large number of turns of wire disposed coaxially around the tube neck 11 and displaced axially from the first electron lens toward the screen 18. The purpose of focusing coil 20 is, as well known in the art, to reconverge or focus the cathode-ray beam, which diverges beyond its cross-over, to a relatively small spot on the fluorescent screen 18. Instead of a magnetic focusing coil 20, an electrostatic type second electron lens can be provided simply by removing a ring of the coating 17 at about the mid-plane of the focusing coil 20, thereby to provide a first anode in the vicinity of the grid 14, the first anode being provided with a separate electrical connection, and a second anode which extends along the neck of the tube and into the flared bulb portion, these two anodes being suitably energized to accomplish the required focusing of the cathode-ray beam on the fluorescent screen 18.

The position of the scanning coils or plates along the neck of the cathode-ray tube is generally indicated at 21. These scanning coils or plates operate in well-known fashion to deflect the cathode-ray beam in a predetermined pattern of scanning lines on the fluorescent screen of the tube.

Fig. 2 is an enlarged cross-sectional view of the electron gun of the tube illustrated in Fig. 1. Elements corresponding to like elements of Fig. 1 are designated by like reference characters. The grid 14 projects through and is supported in an orifice or aperture 22 in the apex of a hollow conical member 23 of insulating material, for example, steatite. The hollow conical member 23 is open at its enlarged end and comprises a means for supporting the grid 14 and the anode 17 substantially in coaxial alignment. The member 23 has an annular rim 24 around the circumference of which are a plurality of apertures 25 through which the relatively rigid conductors 13 are looped. The conductors, as previously stated, support this assembly from the reentrant stem 9 of the tube with grid 14 in axial alignment with the neck 11 of the tube envelope. The relatively rigid electrical conductors 13, each of which extends through one of the apertures 25 in the rim of the hollow member 23, are sealed through the tube envelope 11 for supporting the member 23 within the tube and, in addition to rendering the aforementioned support, serve to complete electrical circuits from the grid and cathode externally of the tube.

A thermionic cathode which preferably includes an indirectly-heated substantially cylindrical cathode sleeve 26 is fixedly disposed within, and in spaced relation to, the inner walls of the grid 14 by an insulating bushing 27 and spacer rings 28. One end of the cathode sleeve 26 is provided with an electron-emissive surface 29 in opposing relation to an aperture 30 in the end of the grid 14. Within the cathode sleeve 26 is a heater 31.

A suitable electrically-fired getter 32 is positioned within the member 23 and near the apex thereof. Two of the conductors 13 are used to complete an electrical circuit to the getter material and comprise a means for supporting the electrically-fired getter within the member 23 and near the closed end thereof. The member 23 thus acts as a shield to prevent overheating of the getter material during seal-in of the reentrant stem of the tube and also acts as a shield when the getter is fired to prevent the getter material from condensing on the inner walls of the neck 11 near the first anode 17. The getter material is conductive and, for that reason, would impair the symmetry of the electrostatic field between the anode 17 and grid 14, thereby impairing the first electron lens action, if it were allowed to be deposited on the inner walls of the neck 11 in contact with the first anode 17.

The area of the electron-emissive surface 29 is sufficiently small that the maximum required electron emission is not less than 50 milliamperes per square centimeter of emissive surface and is preferably as much higher than this value as is consistent with the required length of life of the cathode-ray tube. The grid aperture 30 is preferably made between about 0.5 and 0.75 times the diameter of the cathode-emissive surface 29, the diameter of the surface 29 being substantially that of the cathode sleeve 26. The grid is preferably spaced from the electron-emissive surface 29 a distance about equal to the diameter of the grid aperture 30. The internal diameter of the grid 14 is between about 1.5 to 3 times the diameter of the cathode sleeve 26. In order that there shall be developed adjacent the grid aperture 30 an electrostatic field of high intensity, the external diameter or dimension transverse the axis of the grid 14 should be not greater than, but preferably less than, 0.15 times that of the internal diameter or dimension measured transverse the axis of the first anode 17. As an aid in attaining the desired high intensity field gradient, the closed end of the grid 14 is rounded to have a substantially hemispherical contour.

It will be evident from Fig. 2 that the end of the first anode 17 lies in a plane perpendicular to the axis of the neck 11 at substantially the apertured end of the grid 14. It is this arrangement of the substantially cylindrical first anode 17, substantially cylindrical apertured grid 14, and cathode 26, 29 which comprises the first electron lens of the tube.

Fig. 3 represents a modified grid configuration suitable for use in a tube constructed in accordance with the invention. One end of the grid 14′ is closed by an apertured cup-shaped cap 33 whereby the closed end of the grid is flat or blunt. Similarly, the cathode sleeve 26 is closed at one end by a cap 34 upon the bottom of which is formed the electron-emissive area 29. The cathode sleeve 26 is maintained coaxially aligned within the grid 14′ by insulating discs 35, 35 which are held in position by split rings 36, 37, and 38. The grid 14′ is provided with a slot 39 to permit the closed chamber 40 thus formed to be suitably exhausted when the tube itself is exhausted during the forming period. This grid construction is slightly more complex than that of the Fig. 2 construction, but has substantially similar characteristics and is much better from the standpoint of mechanical construction. Additionally, the construction permits more accurate alignment of the cathode and grid.

It will now be apparent from the foregoing description of the invention that the invention has a number of outstanding advantages in addition to the improvement of the spot characteristic. The size of the oxide-coated electron-emissive area of the cathode has been greatly reduced, thus reducing the amount of material which is released from the cathode during the breakdown or forming process, whereby the loss of emission during the operating life of the tube by negative ion bombardment of the emissive surface is correspondingly reduced. Similarly, the amount of metal in the electron gun structure is reduced, thus minimizing the amount of gas which must be released by bombardment during the forming process and which is released during normal operation of the tube.

A tube constructed in accordance with the invention has the advantage of simplicity of construction, the first anode being merely a coating on the inner wall of the neck of the tube envelope, or being a substantially cylindrical conductor closely fitting the inner walls of the neck and supported directly therefrom. Where the anode is comprised by a coating, the problem of properly trimming the end of the anode adjacent the grid is not critical, since almost the entire first electron lens action is localized in the vicinity of the grid aperture. Furthermore, the problem of properly aligning the first anode and grid is also less critical since the size of the grid is decreased to the order of the grid aperture size and the coaxial relation is not critical, also because of the localization of electron lens action.

The decrease in the area of the electron-emissive surface of the cathode results in a substantial reduction of the heater wattage. Whereas the prior art cathode-ray tubes generally require about 5 watts of cathode heater power, a tube constructed in accordance with the invention requires only about 0.8 watt. This means not only reduced power drain from the heater supply, but also a decrease in the temperature of the metal parts of the tube, a decrease in the temperature of the glass wall of the tube neck and the reentrant stem and its seal, and a decrease in the temperature of the getter of the tube whereby there is less tendency of all of these elements to evolve gas throughout the operating life of the tube.

An additional advantage of the invention is that the grid-to-cathode capacitance is materially decreased by the relatively small dimensions of the electron gun elements. Thus, while tubes of the prior art generally have a grid-cathode capacitance of from 10–20 micro-microfarads, a tube constructed in accordance with the invention has a grid-cathode capacitance in the order of one or two micro-farads.

While the grid and the first anode have been described as cylindrical or substantially cylindrical, it is to be understood that these terms are to be construed according to their generally accepted usage to define and describe hollow generally cylindrical or annular elements or elements of a configuration which are equivalent thereto insofar as they exhibit the aforementioned electrostatic field intensity phenomenon attributed to cylindrical conductors of unequal diameters.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A cathode-ray tube comprising, a thermionic cathode, a first electron lens comprising a substantially cylindrical apertured grid surrounding said cathode and a substantially cylindrical first anode, said grid having an external diameter less than 0.15 times that of the internal diameter of said anode, and means for supporting said grid and anode substantially in coaxial alignment.

2. A cathode-ray tube comprising, a thermionic cathode, a first electron lens comprising a substantially cylindrical apertured grid surrounding said cathode and a substantially cylindrical first anode axially displaced from said grid, said grid having an external diameter less than 0.15 times that of the internal diameter of said anode, and means for supporting said grid and anode substantially in coaxial alignment.

3. A cathode-ray tube comprising, a thermionic cathode having a predetermined minimum permissible size, a first electron lens comprising a substantially cylindrical apertured grid surrounding said cathode and a substantially cylindrical first anode, the external diameter of said grid being not greater than 0.15 times that of the internal diameter of said anode and of a smallness limited only by the size of said cathode, and means for supporting said grid and anode substantially in coaxial alignment.

4. A cathode-ray tube comprising, an evacuated tube envelope having a substantially cylindrical neck, a thermionic cathode, a first electron lens comprising a substantially cylindrical apertured grid surrounding said cathode and an electrically-conductive first anode coating on the inner walls of the neck of said envelope, said grid having an external diameter less than 0.15 times that of the internal diameter of said conductive first anode coating, and means for supporting said grid substantially in coaxial alignment with said anode coating.

5. A cathode-ray tube comprising, an evacuated tube envelope having a substantially cylindrical neck, a thermionic cathode, a first electron lens comprising a substantially cylindrical apertured grid surrounding said cathode and a cylindrical first anode closely fitting the inner walls of said neck, said grid having an external diameter less than 0.15 times that of the internal diameter of said anode, and means for supporting said grid and anode substantially in coaxial alignment.

6. A cathode-ray tube comprising, an evacuated tube envelope having substantially cylindrical neck and flared bulb portions, a thermionic cathode, a first electron lens comprising a substantially cylindrical apertured grid surrounding said cathode and a continuous electrically-conductive anode coating on the inner walls of the neck and flared bulb portions of said envelope, said grid having an external diameter less than 0.15 times that of the internal diameter of said anode coating, and means for supporting said grid substantially in coaxial alignment with said anode coating.

7. A cathode-ray tube comprising, a thermionic cathode, a first electron lens comprising a substantially cylindrical apertured grid surrounding said cathode and a substantially cylindrical first anode, said grid having an external diameter less than 0.15 times that of the internal diameter of said anode, means for supporting said grid and anode substantially in coaxial alignment, and a second electron lens substantially coaxial with and axially displaced from said first electron lens away from said cathode.

8. A cathode-ray tube comprising, a thermionic cathode having an electron-emissive surface, the permissible electron emission of which is at least as high as 50 milliamperes per square centimeter of emissive surface, a first electron lens comprising a substantially cylindrical apertured grid surrounding said cathode and a substantially cylindrical first anode, said grid having an external diameter less than 0.15 times that of the internal diameter of said anode, and means for supporting said grid and anode substantially in coaxial alignment.

9. A cathode-ray tube comprising, an indirectly heated cathode having a cylindrical sleeve and an electron-emissive surface at the end thereof, a first electron lens comprising a substantially cylindrical apertured grid surrounding said cathode and a substantially cylindrical first anode, said grid having an external diameter less than 0.15 times that of the internal diameter of said anode and an internal diameter not less than 1.5 times that of the external diameter of said cathode sleeve, and means for supporting said grid, said cathode sleeve, and said anode substantially in coaxial alignment.

10. A cathode-ray tube comprising, a thermionic cathode having a cylindrical sleeve and an electron-emissive surface at the end thereof, a first electron lens comprising a substantially cylindrical apertured grid surrounding said cathode in spaced relation thereto and a substantially cylindrical first anode, the aperture of said grid having a diameter substantially equal to the spacing of said grid and cathode and said grid having an external diameter less than 0.15 times that of the internal diameter of said anode, and means for supporting said grid and anode substantially in coaxial alignment.

11. A cathode-ray tube comprising, a thermionic cathode having a substantially cylindrical sleeve and an electron-emissive surface at the end thereof, a first electron lens comprising a substantially cylindrical apertured grid surrounding said cathode and a cylindrical first anode, the aperture of said grid having a diameter substantially between 0.5 and 0.75 times the external diameter of said cathode sleeve and said grid having an external diameter less than 0.15 times that of the internal diameter of said anode, and means for supporting said grid, said cathode sleeve, and said anode substantially in coaxial alignment.

12. A cathode-ray tube comprising, an evacuated tube envelope having a cylindrical neck, a thermionic cathode having a cylindrical sleeve and an electron-emissive surface on one end thereof, a first electron lens comprising a substantially cylindrical apertured grid surrounding said cathode and a cylindrical first anode disposed on the inner surfaces of the neck of said envelope, the electron emission of said emissive surface being not less than 50 milliamperes per square centimeter of said emissive surface and said grid having a diameter substantially between 1.5 and 3 times the diameter of said cathode sleeve and less than 0.15 times that of the internal diameter of said anode, and means for supporting said grid, said cathode sleeve, and said anode substantially in coaxial alignment.

13. A cathode-ray tube comprising, a thermionic cathode, a first electron lens comprising a substantially cylindrical apertured grid surrounding said cathode and a cylindrical first anode, said grid having an external diameter less than 0.15 times that of the internal diameter of said anode, means for supporting said grid and anode substantially in coaxial alignment comprising a hollow member of insulating material open at one end and closed at the other end except for an orifice through which said grid projects, and means for supporting an electrically-fired getter within said member near the closed end thereof.

14. A cathode-ray tube comprising, a thermionic cathode, a first electron lens comprising a substantially cylindrical apertured grid surrounding said cathode and a cylindrical first anode, said grid having an external diameter less than 0.15 times that of the internal diameter of said anode, means for supporting said grid and anode substantially in coaxial alignment comprising a hollow conical member of insulating material having an open base end and an apertured apex through which said grid projects, and means for supporting an electrically-fired getter within said member near the apex thereof.

15. A cathode-ray tube comprising, an evacuated tube envelope, a thermionic cathode, a first electron lens comprising a substantially cylindrical apertured grid surrounding said cathode and a cylindrical first anode, said grid having an external diameter less than 0.15 times that of the internal diameter of said anode, and means for supporting said grid and anode substantially in coaxial alignment comprising a hollow conical member of insulating material open at the base and supporting said grid and cathode at the apex thereof, and relatively rigid electrical conductors each extending through apertures in the rim of said member and sealed through said tube envelope for supporting said member within said tube and for completing electrical circuits from said grid and cathode externally of said tube.

16. A cathode-ray tube comprising, a source of electrons, a first electron lens comprising an annular first anode and an annular apertured control electrode surrounding said source of electrons, and means for supporting said control electrode and said anode substantially in coaxial alignment, said control electrode having an external dimension transverse its axis less than 0.15 times that of a corresponding internal dimension of said anode measured transverse the axis thereof.

17. A cathode-ray tube comprising, a source of electrons, a first electron lens comprising an annular first anode and an annular apertured control electrode surrounding said source of electrons, and means for supporting said control electrode and said anode substantially in coaxial alignment, said control electrode having a maximum external dimension transverse its axis less than 0.15 times that of a corresponding internal dimension of said anode measured transverse the axis thereof at the position of closest spacing between said anode and said aperture of said control electrode.

18. A cathode-ray tube comprising, a source of electrons, a first electron lens comprising an annular first anode and an annular apertured control electrode surrounding said source of electrons, and means for supporting said control electrode and said anode substantially in coaxial alignment, said control electrode having an external diameter less than 0.15 times that of the internal diameter of said anode measured at the position of closest spacing between said anode and said aperture of said control electrode.

RUDOLF C. HERGENROTHER.